US006330687B1

(12) United States Patent
Griffith (10) Patent No.: US 6,330,687 B1
(45) Date of Patent: Dec. 11, 2001

(54) SYSTEM AND METHOD TO MAINTAIN PERFORMANCE AMONG N SINGLE RAID SYSTEMS DURING NON-FAULT CONDITIONS WHILE SHARING MULTIPLE STORAGE DEVICES DURING CONDITIONS OF A FAULTY HOST COMPUTER OR FAULTY STORAGE ARRAY CONTROLLER

(75) Inventor: Geoffrey J Griffith, Laurel, MD (US)

(73) Assignee: Digi-Data Corporation, Jessup, MD (US)

( * ) Notice: Subject to any disclaimer, the term of this patent is extended or adjusted under 35 U.S.C. 154(b) by 0 days.

(21) Appl. No.: 09/192,016

(22) Filed: Nov. 13, 1998

(51) Int. Cl.[7] ........................................................ H02H 3/05
(52) U.S. Cl. ........................ 714/6; 714/2; 714/4; 714/5; 714/8; 714/11; 714/12
(58) Field of Search .................................. 714/6, 2, 4, 5, 714/8, 11, 12

(56) References Cited

U.S. PATENT DOCUMENTS

| | | |
|---|---|---|
| 4,757,474 | 7/1988 | Fukushi et al. . |
| 5,617,530 | 4/1997 | Stallmo et al. . |
| 5,689,678 | 11/1997 | Stallmo et al. . |
| 5,729,763 * | 3/1998 | Leshem ................................ 395/858 |
| 5,761,705 | 6/1998 | DeKoning et al. . |
| 5,768,623 * | 6/1998 | Judd et al. ............................ 395/857 |
| 5,774,673 | 6/1998 | Lubbers et al. . |
| 5,812,754 | 9/1998 | Lui et al. ................................ 714/6 |
| 6,192,027 * | 2/2001 | El-batal ................................ 370/222 |

OTHER PUBLICATIONS

Ridge, Peter M., An Introduction to RAID, The Book of SCSI, A Guide for Adventurers, pp. 323–329, No Starch Press, USA.

* cited by examiner

Primary Examiner—Dieu-Minh Le
Assistant Examiner—Tim Vo
(74) Attorney, Agent, or Firm—William S. Ramsey (57) ABSTRACT

In order to provide redundancy of host computers and storage array controllers, and thereby protect operation of a RAID system against host computer or storage array controller failure, two single RAID subsystems are conventionally provided in a conventional active-active configuration. This means each storage array controller has electrical access to each disk in its array as well as each disk in the other controller's array. The resultant interference between the controllers in accessing the disk channels causes the active-active system to normally function at approximately 130% of the speed of a single RAID system, rather than the optimum 200% of the speed of a single RAID system. The system of this invention, FULL-SPEED ACTIVE-ACTIVE redundant RAID system, contains a normally open switch or repeater which allows access by each storage array controller only to that controller's array of disks when both host computers and storage array controllers are operating normally. This provides a speed of 200% of the speed of a single RAID system. When one host computer or storage array controller fails, the switch or repeater is automatically closed, allowing the storage array controller of the functioning subsystem to control all of the disks of both single RAID subsystems.

17 Claims, 7 Drawing Sheets

SYSTEM AND METHOD TO MAINTAIN PERFORMANCE AMONG N SINGLE RAID SYSTEMS DURING NON-FAULT CONDITIONS WHILE SHARING MULTIPLE STORAGE DEVICES DURING CONDITIONS OF A FAULTY HOST COMPUTER OR FAULTY STORAGE ARRAY CONTROLLER

CROSS-REFERENCE TO RELATED APPLICATIONS

Not Applicable.

STATEMENT REGARDING FEDERALLY SPONSORED RESEARCH OR DEVELOPMENT

Not Applicable.

MICROFICHE APPENDIX

Not Applicable.

BACKGROUND OF THE INVENTION (1) Field of the Invention

This invention relates to systems in which multiple controllers are used to control an array of storage devices.

(2) Description of Related Art Including Information Disclosed Under 37 CFR 1.97 and 37 CFR 1.98.

The acronym RAID refers to systems which combine disk drives for the storage of large amounts of data. In RAID systems the data is recorded by dividing each disk into stripes, while the data are interleaved so the combined storage space consists of stripes from each disk. RAID systems fall under 5 different architectures, plus one additional type, RAID-0, which is simply an array of disks and does not offer any fault tolerance. RAID 1–5 systems use various combinations of redundancy, spare disks, and parity analysis to achieve conservation reading and writing of data in the face of one and, in some cases, multiple intermediate or permanent disk failures. Ridge, P. M. *The Book Of SCSI: A Guide For Adventurers*. Daly City Calif. No Starch Press. *1995* p. 323–329. In this application, a RAID system consisting of one host computer, one controller, and an array of multiple channels, each channel consisting of several direct access storage devices in serial electrical connection, will be termed a "single RAID subsystem".

Conventional RAID systems guard against failure of a controller by the active-active system. This system consists of two single RAID subsystems, each with a host computer, a controller, and an array of direct access storage units. The direct access storage units, in the most common case, disks, are arranged in channels in which the disks are connected in a series. A common arrangement is for one controller to control six channels of five disks in each channel. In the active-active system, each channel of one system is connected electrically to another channel in another system. This means that, in the event of the failure of one controller, the other controller can serve all 10 disks in each "double" channel. Unfortunately, during normal operation when both controllers are operating there is interference associated with the fact that two controllers are simultaneously accessing a double channel of ten disks. This interference reduces the speed of a normally acting active-active system to about 130% of the speed of a single RAID subsystem rather than the 200% of a single RAID subsystem expected from the operation of two single RAID subsystems.

U.S. Pat. No. 5,768,623 discloses a system for storing data for several host computers an several storage arrays which are linked so that each storage array can be accessed by any host computer. The system uses dual ported disks and involves serial communication channels. No switches or repeaters are used to isolate the disk arrays during normal functioning of host computer and storage array controllers.

U.S. Pat. No. 5,729,763 discloses a system for storing data in which each of a number of disk interfaces is coupled to a corresponding disk drive by unidirectional channels. Each disk interface includes a unidirectional switch. Use of the switches allows a defective disk drive or switch to be removed without requiring shut-down of the entire system.

The RAID systems of the prior art do not provide the advantages of the present invention, that of increasing the overall speed of N same-speed single RAID subsystems to N times the speed of a single RAID system under normal conditions while providing for the sharing of multiple storage devices during conditions in which a host computer or storage array controller fails.

The system of the present invention is like the conventional active-active system except it incorporates a switch or repeater which isolates the channels of the two or more single RAID subsystems when all the host computers and controllers are functioning properly. If three same speed single RAID subsystems are included, for example, the system functions at 300% the speed of a single RAID subsystem during the vast preponderance of the time when all of the host computers and storage array controllers are functioning properly. In the case of a host computer or storage array controller failure, however, the bidirectional switch or bidirectional repeater closes and establishes electrical connection between the single RAID subsystem with the failure and the single RAID subsystem adjacent to it in the system. In this configuration the system has the speed expected of a conventional active-active system, after a host computer or storage array controller failure, about 100% of the speed of an individual RAID subsystem for the two affected single RAID subsystems. The remaining unaffected single RAID subsystems continue to operate at the unhindered maximum speed.

BRIEF SUMMARY OF THE INVENTION

The redundant RAID system of this invention extends the protection of the operation of a RAID system from providing for disk failure to providing for host computer or storage array controller failure. This invention consists of two or more (N) single RAID subsystems which are linked through the disk channels by a bidirectional switch or bidirectional repeater which is normally in the open position. Thus the system normally functions as (N) independent single RAID subsystems and functions at the speed of one single RAID subsystem multiplied by N if the single RAID subsystems all have the same speed. If the speed of the single RAID subsystems vary, the system normally functions at a speed which is the sum of the single RAID subsystems. In the event of a host computer or storage array controller failure, the bidirectional switch or repeater between two adjacent single RAID systems is changed to the closed position and the channels of disks of the functioning controller are electrically linked to the channels of disks of the disabled system. The functioning controller thus takes over the function of the disabled controller and provides continuing service, albeit at a reduced speed. The unaffected single RAID subsystems of the redundant RAID system of this invention continue to function unhindered.

In the normal operating mode the present invention enables each storage array controller to communicate with a set of disks independently of any other controller, thus operating the redundant RAID system at the speed of N single RAID subsystems. In the event of failure of one of the host computers or storage array controllers of a component single RAID subsystem, the system automatically assumes the configuration of a conventional active-active system with respect to the affected single RAID subsystem and the adjacent unaffected single RAID subsystem. The redundant RAID system continues to operate with access by the functioning adjacent RAID subsystem host computer and storage array controller to all of the disks of the failed and the functioning single RAID subsystems, although at a reduced speed.

Two advantages are associated with the present invention.

Firstly, a host computer and storage array controller redundant RAID system with a normal speed much higher than the conventional active-active host computer and storage array controller redundant systems is provided. In the event of failure of a host computer or storage array controller the speed of the system is no lower than that of a conventional host computer and storage array controller redundant system. If greater than two single RAID subsystems are included in the redundant RAID system, the speed of the system under nearly all conditions is greater than the conventional redundant system.

Secondly, the use of bidirectional repeater switching means allows the use of relatively long cables linking the disk channels, and provides additional flexibility in the physical location of the single RAID subsystem components of the invention.

The objective of this invention is to provide a host computer and storage array controller redundant RAID system which continues to operate despite the failure of a single host computer or storage array controller.

Another objective of this invention is to provide a N host computer and storage array controller redundant RAID system which operates at the speed of N single RAID subsystems if all have the same speed in the absence of failures, yet provides protection against host computer or storage array controller failure.

Another objective of this invention is to provide a N host computer and storage array controller redundant RAID system which continues to operate at a reduced speed during a host computer or storage array controller failure while the system continues to operate at the speed of N-2 single RAID systems if all subsystems have the same speed.

Another objective of this invention is to provide a N host computer and storage array controller redundant RAID system which continues to operate as long as fewer than or equal to N/2 of the single RAID subsystems suffer a failure of the host computer or storage array controller and each single RAID subsystem with a failed host computer or storage array controller is adjacent to a single RAID subsystem without a failure.

Another objective of this invention is to provide a host computer and storage array controller redundant RAID system which has repeater connections between the single RAID subsystem channels which allow extended physical separation between the single RAID subsystem components.

A final objective of this invention is to provide a host computer and storage array controller redundant RAID subsystem which is inexpensive, resistant to failure, easy to maintain, and is without harmful effects on the environment.

DETAILED DESCRIPTION OF THE INVENTION

Figure 1:
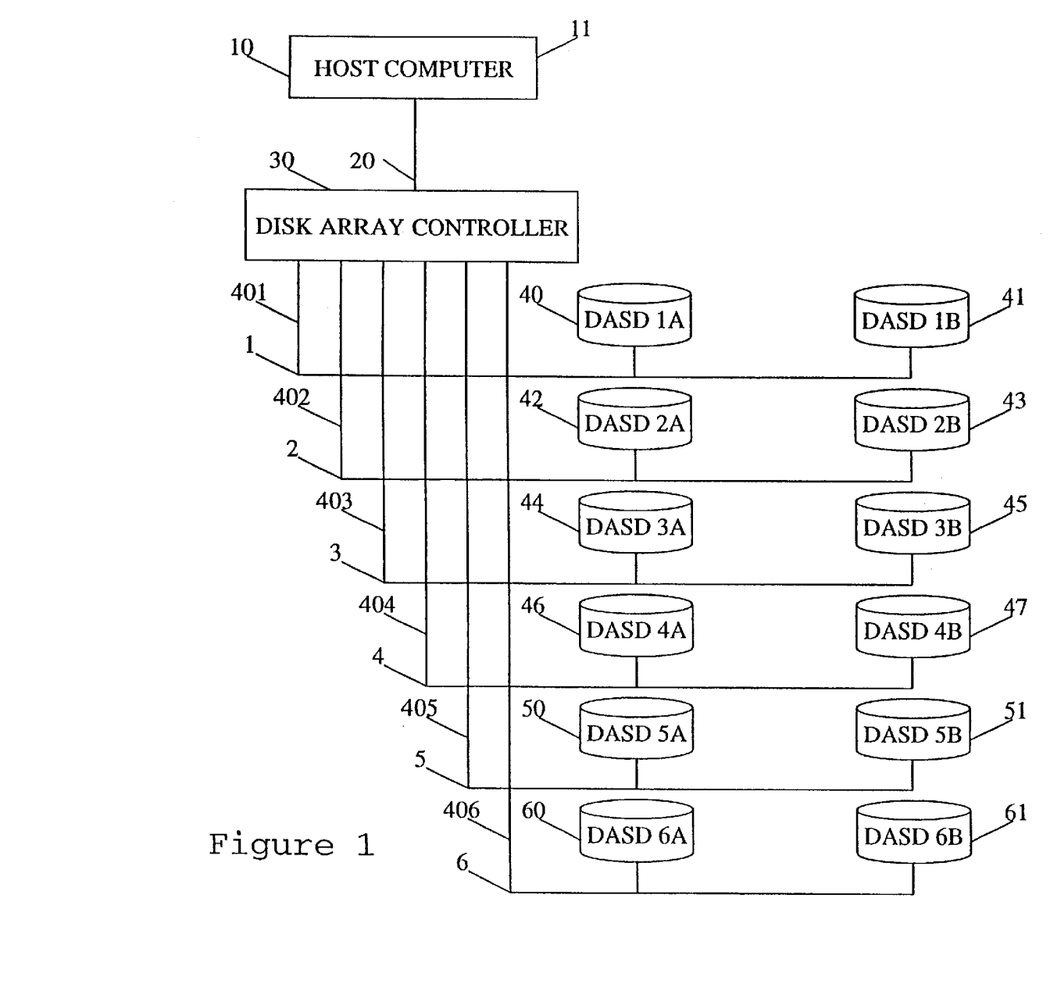
FIG. 1 is a diagrammatic representation of a single RAID subsystem.

FIG. 1 is a schematic of the external view of a RAID system referred to in this application as a "single RAID subsystem". The single RAID subsystem comprised a single host computer 10, a storage array controller 30, and an array of direct access storage devices (DASD). The host computer 10 is electrically connected to the disk array controller 30 by connector means 20.

The connector means may be a wire or cable connector or a SCSI bus.

In all of the Figs. the convention is followed of depicting connectors which are not electrically connected as lines which cross perpendicularly. An electrical connection is indicated by a line which terminates perpendicularly at another line or at a symbol for a component. Thus in FIG. 1 the host computer 10 is electrically connected to disk array controller 30 by connector 20. Connector 401 is electrically connected to disk array controller 30 and to DASD 1A 40 and to DASD 1B 41 but is not electrically connected to connectors 402 to 406.

DASD may be disks, tapes, CDS, or any other suitable storage device. A preferred DASD is a disk.

All the DASD and connectors in a system taken as a whole is referred to as an "array" of DASD. The DASD are arranged in channels which consist of a number of DASD which are electrically connected to each other and to the disk array controller by connector means. The channels are designated in FIG. 1 as 1 to 6. The number of channels may vary. A preferred number of channels is 6.

A channel, for example channel 1, consists of connector 401, DASD 1A 40, and DASD 1B 41. Although only two DASD are depicted in channel 1 of FIG. 1, there may be as many as 126 DASD in a channel. A preferred number of DASD in a channel is five.

A group of DASDs served by separate channels across which data is striped is referred to as a "tier" of DASDs. A DASD may be uniquely identified by a channel number and a tier letter, for example DASD 1A is the first disk connected to channel 1 of the controller.

A preferred storage array controller 30 is the Z-9100 Ultra-Wide SCSI RAID controller manufactured by Digi-Data Corporation, Jessup Md.

Additional tiers of DASDs may be used.

Any suitable host computer 10 may be used. A preferred host computer 10 is a Pentium-based personal computer available from multiple vendors such as IBM, Research Triangle Park, N.C.; Compaq Computer Corp, Houston, Tex., or Dell Computer, Austin, Tex.

Figure 2:
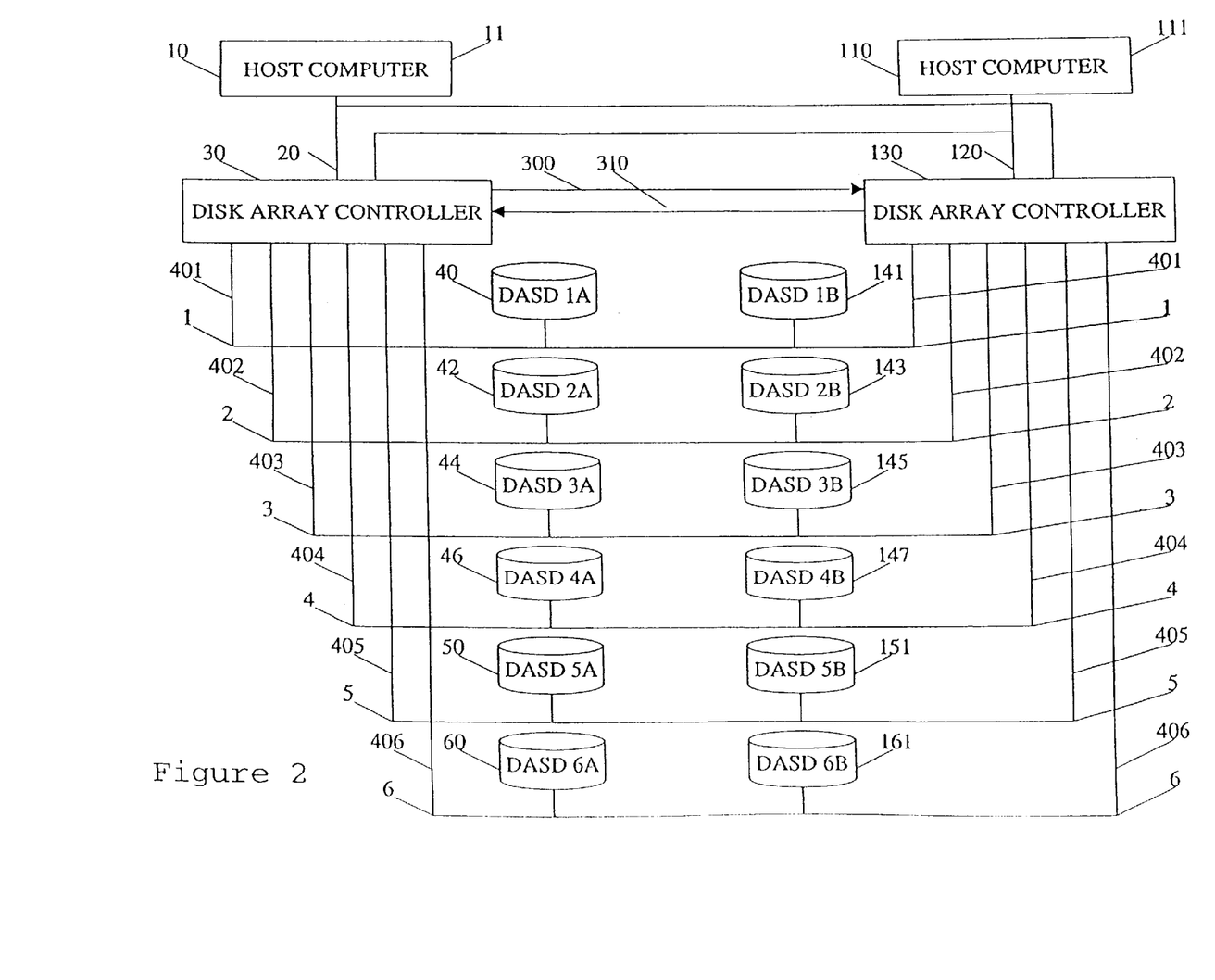
FIG. 2 is a diagrammatic representation of a conventional prior art active-active RAID system with two controllers and two host computers.

FIG. 2 shows the prior art active-active redundant host computer and storage array controller RAID system. This system comprises two single RAID subsystems of FIG. 1, system 11 and system 111 in FIG. 2 which are electrically connected through the disk array controllers and through the arrays of DASD.

FIG. 2 shows system 11 which comprises host computer 10, connected by connector 20 to disk array controller 30, and the system 11 array of which channels 1 to 6 consisting of connectors 401 to 406, respectively, and associated DASD 40–60, respectively. Only one DASD of each channel is depicted on FIG. 2.

FIG. 2 also shows system 111 which comprises host computer 110, connected by connector 120 to disk array controller 130, and the system 111 array of which channels 1 to 6 consisting of connectors 401 to 406, respectively, and associated DASD 141–161, respectively. Only one DASD of each channel is depicted on FIG. 2. Note that in both system 11 and system 111 the arrays are electrically connected bidirectionally to each system. For example, array 1 of system 11 is connected by connector 401 to array 1 of system 111.

The disk array controller 30 of system 11 is connected to the disk array controller 130 of system 111 by a bidirectional connector which is depicted in FIG. 2 as connectors 300 and 310. Disk array controller 30 contains internal software which generates a binary signal termed a "normal operating signal" or a "heartbeat" at an interval of a few milliseconds when the disk array controller 30 and host computer 10 of subsystem 11 are operational. When the host computer or disk array controller is in a defective condition, the emission of the normal operating signal ceases. The normal operating signal is emitted from disk array controller over connector 300 to the disk array controller 130 of subsystem 111. Similarly, when the host computer 110 and disk array controller 130 of subsystem 111 are operating normally, a normal operating signal is emitted from disk array controller 130 over connector 310 to disk array controller 30 of subsystem 11.

When one disk array controller no longer receives the normal operating signal because the host computer or disk array controller of the other system is defective, the operational disk array controller begins to assume the tasks of the defective array of the system containing the defective component. For example, if disk array controller 30 of subsystem 11 ceases to receive a normal operating signal from disk array controller 130 of subsystem 111, disk array controller 30 will assume the control and service of not only its own DASD, 40–60 in FIG. 2, but also of the DASD of subsystem 111, 141–161. Connector 20 also connects host computer 10 with disk array controller 130. Similarly connector 120 connects host computer 110 with disk array controller 30. Connectors 20 or 120 are used to transfer information from the host computer of a single RAID subsystem which has a faulty host computer or disk array controller to the disk array controller of the functional single RAID subsystem. This protects each component of the active-active RAID system from failure of any one host computer or disk array controller and allows each DASD to be read to or written from.

Unfortunately, the protection against failure in the system of FIG. 2 is achieved at a cost in speed of operation. An interference condition is created in any channel 401–406 of FIG. 2 because two disk array controllers are using a single connector to address the DASD of two single RAID subsystems. Each disk array controller must wait until the conductor is free before addressing its DASD. The net effect is a considerable reduction of speed in normal operation. If the speed of a single RAID subsystem is 100% (relative speed), then the relative speed of the active-active system of FIG. 2 under normal operating conditions is about 130%, rather than the 200% expected of two single RAID subsystems (which, however, do not enjoy the fault-tolerance associated with the redundant host computers and disk array controllers).

The present invention is designed to overcome the lack of performance associated with the active-active RAID system under normal conditions while retaining the fault-tolerance under conditions of failure of a host computer or disk array controller.

Figure 3:
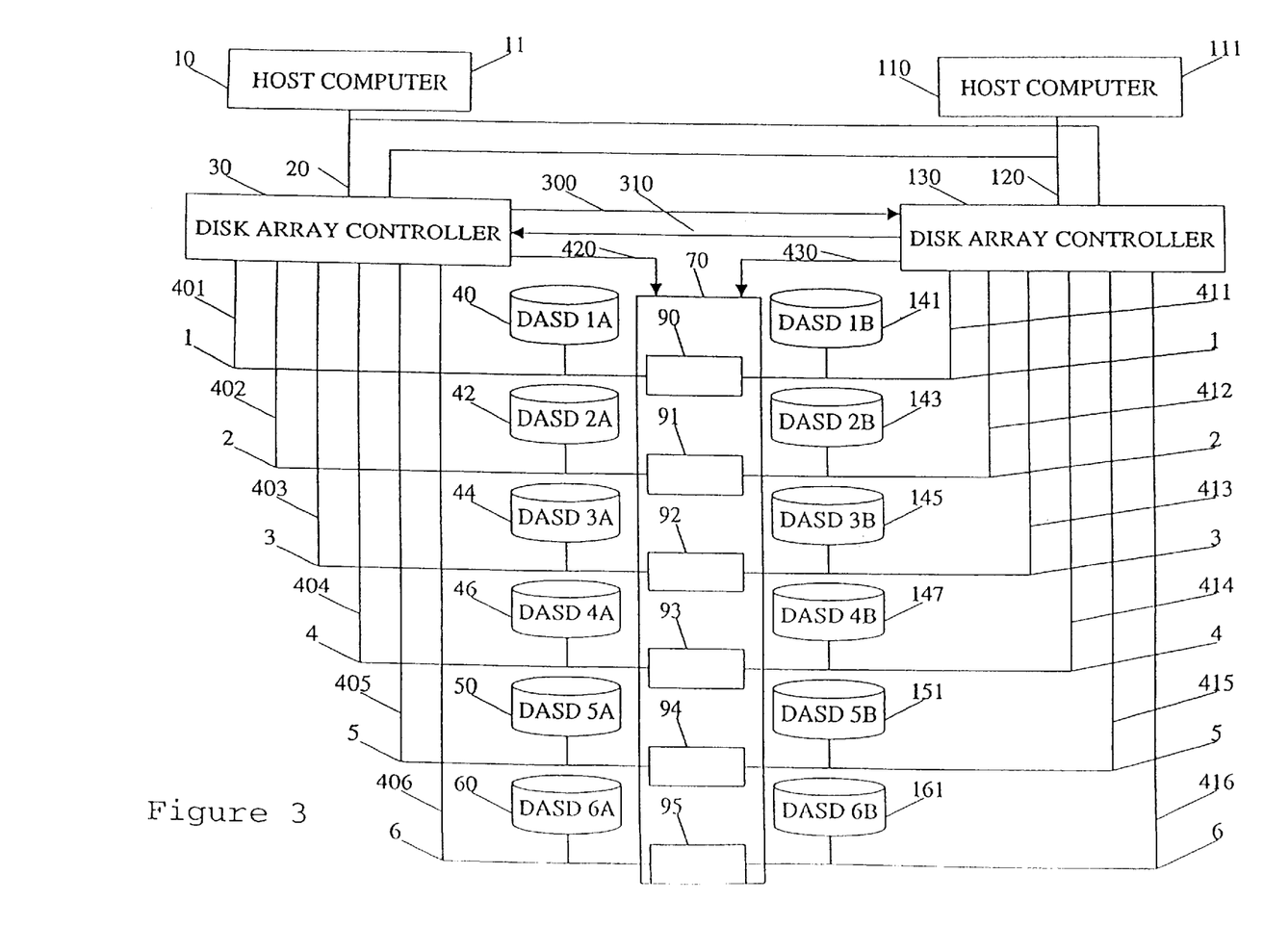
FIG. 3 is a diagrammatic representation of one embodiment of the FULL-SPEED ACTIVE-ACTIVE redundant RAID system of the present invention.

A first embodiment of the present invention, termed the FULL-SPEED ACTIVE-ACTIVE redundant RAID system, is depicted in FIG. 3.

The system in FIG. 3 is identical to that in FIG. 2 with the exception of the addition of a normally open switch means between the channels which are connected in FIG. 2. and the means to control the switch means. In FIG. 3 the electrical connector 401 between channel 1 of subsystem 11 and channel 1 of subsystem 111 is intercepted by core 70. The core 70 consists of connections to channel 1 of subsystems 11 and 111 with normally open switch means, in this case a normally open repeater 90 electrically connected to and interposed between the segments of connector 401, which has been segmented into connector 401 and 411. When repeater 90 of core 70 is in the open position, there is no electrical connection between channel 1 of subsystem 11 and channel 1 of subsystem 111. Similarly, switching means or repeaters 91–95 are interposed in the connections between channels 2, 3, 4, 5, and 6, respectively, and while the switching means or repeater 91–95, respectively, are in the open position, there are no electrical connections between channels 2, 3, 4, 5, and 6 of subsystem 11 and channels 2, 3, 4, 5, and 6 of subsystem 111, respectively. The core 70 is a container which contains and supports the switching means and the connection means for attaching switching means to a channel. Additional detail on the core 70 is found in FIG. 7.

Any suitable switching means may be used such as a switch or a repeater. A preferred repeater is model SYM53C141 manufactured by LSI Logic Corp., Milpitas, Calif. The use of a repeater provides the advantage of amplifying the signal, thus making possible a greater physical distance between the single RAID subsystems of the redundant RAID system.

A preferred disk is a single port disk model ST39102LW manufactured by Seagate Technology, Inc. Scotts Valley, Calif.

When the switching means of the core are closed the electrical connections between the channels of subsystem 11 and subsystem 111 are formed. Under the conditions of closed switch means the system of FIG. 3 is electrically equivalent to that of the active-active system of FIG. 2.

The core 70 is electrically connected to disk array controller 30 by connector 420. The core 70 is also electrically connected to disk array controller 130 by connector 430.

In operation, the switching means 90–95 in core 70 are normally open while each host computer and disk array controller is functioning normally. Under these normal conditions the channels of subsystems 11 and 111 are electrically isolated from each other. The relative speed achieved by the system is 200% of the speed of a single RAID subsystem.

In the rare event of failure of one host computer or disk array controller the normal operating signal or heartbeat emitted from a disk array controller is stopped. When the other disk array controller does not receive a normal operating signal it emits a closure signal to the core. The normally open switching means are now closed and the electrical connections between the channels of the functional and non-functional systems are closed, allowing the functional system to control the DASD of both subsystems.

In FIG. 3, if the host computer 110 or disk array controller 130 of subsystem 111 fails, the normal operating signal or heartbeat emitted from disk array controller 130 to disk array controller 30 would cease. Disk array controller 30 would emit a closure signal to the core 70 via connector 420. The switching means 90–95 in core 70 would close, establishing electrical connection between channels 1–6 of subsystems 11 and 111, respectively. Disk array controller 30 would then control the read and write function of the DASD of both subsystem 11 and 111. In analogous fashion, failure of host computer 10 or disk array controller 30 of subsystem 11 would result in cessation of the normal operating signal or heartbeat from disk array controller 30 to disk array controller 130. Disk array controller 130 would emit a closure signal to each core 70–75 via connector 430. The switching means 90–95 in core 70 would close, establishing electrical connection between channels 1–6 of subsystems 11 and 111, respectively. Disk array controller 130 would then control the read and write function of the DASD of both subsystems 11 and 111. Connector 20 also connects host computer 10 with disk array controller 130. Similarly connector 120 connects host computer 110 with disk array controller 30. Connectors 20 or 120 are used to transfer information from the host computer of a single RAID subsystem which has a faulty host computer or disk array controller to the disk array controller of the functional single RAID subsystem. Under these fault conditions the relative speed expected is 100% of that expected from a single RAID subsystem.

The advantage of the present invention is that it achieves a relative speed of 200% under normal conditions in the absence of fault in host computer or disk array controller. Under the rare conditions of fault, the present invention has a relative speed of 100%. This is to be contrasted to the conventional active-active RAID system which has a relative speed of 130% under normal conditions and 100% under fault conditions. Finally, it is to be contrasted with a "system" consisting of two unconnected single RAID subsystems, which have a normal speed of 200%, but under conditions of fault in one host computer or disk array controller, is unable to access the DASD served by that host computer or disk array controller.

Figure 4:
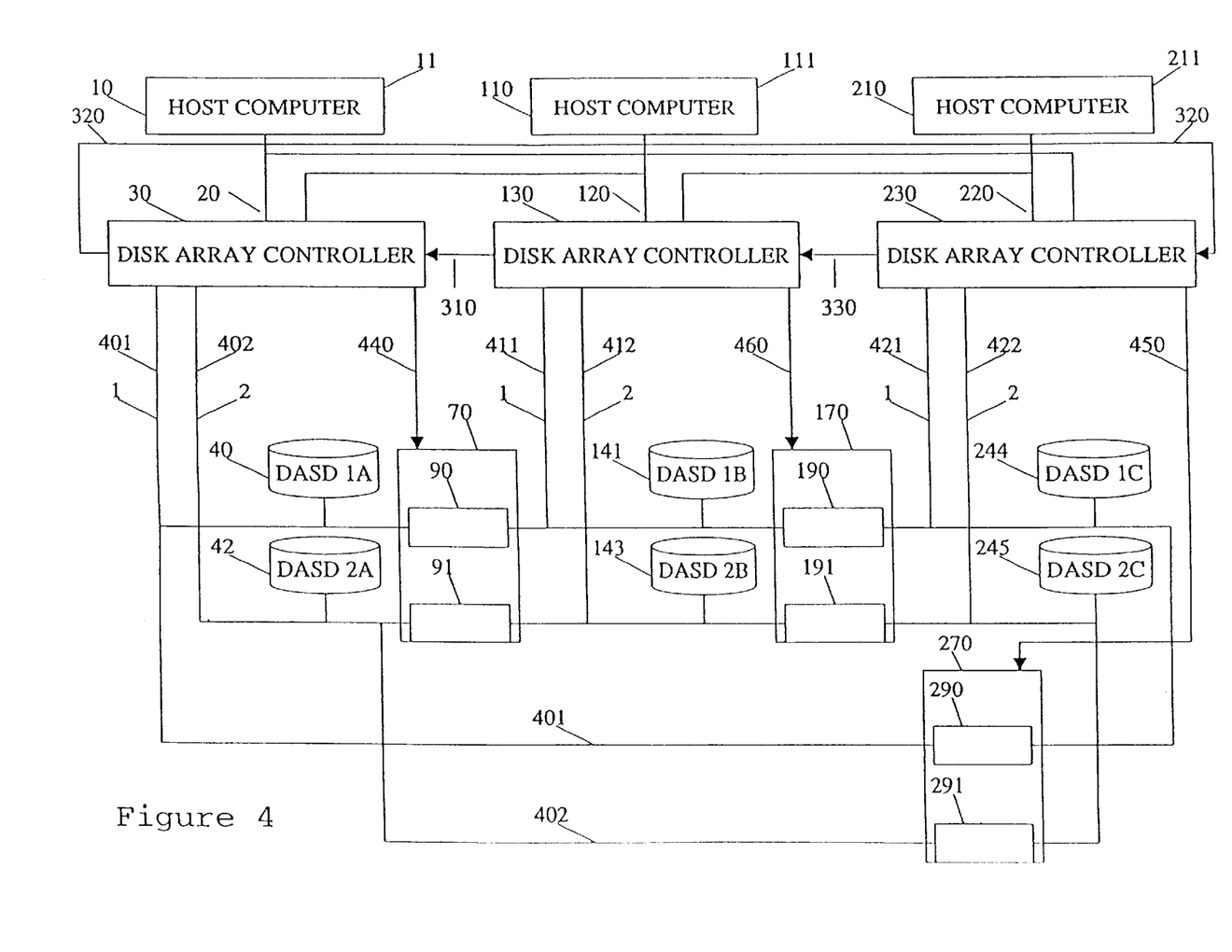
FIG. 4 is a diagrammatic representation of a second embodiment of the FULL-SPEED ACTIVE-ACTIVE redundant RAID system of the present invention.

FIG. 4 is a diagrammatical representation of a second embodiment of the present invention. In FIG. 4 the FULL-SPEED ACTIVE-ACTIVE redundant RAID system is shown with 3 single RAID subsystems, 1, 111, and 211. This may be extended to N subsystems, where N is a number greater than two, by the addition of single RAID subsystems. In the second embodiment invention the number of cores is the same as the number of single RAID subsystems and cores. In the second embodiment the normal operating signal of one disk array controller is received by the adjacent disk array controller. There is no bidirectional exchange of normal operating signals between one set of two disk array controllers as in the first embodiment of the invention. In the second embodiment, the system normally functions at a speed which is the sum of the speed of the component single RAID subsystems. When a fault in a host computer or disk array controller occurs, the single RAID subsystem adjacent to the single RAID subsystem with the fault takes over the control of both its DASD and those of the single RAID subsystem with the faulty component. The remaining single RAID subsystems continue to operate normally.

The system depicted in FIG. 4 is the same as than in FIG. 3 except as noted below. This second embodiment comprises 3 single RAID subsystems, 11, 111, and 211 which are arranged so that subsystem 11 is adjacent to subsystem 211, subsystem 211 is adjacent to subsystem 111, and subsystem 111 is adjacent to subsystem 11. This may be extended to include N subsystems. In FIG. 4 only two channels in each single RAID subsystem are shown for convenience. A preferred number of channels in each single RAID subsystem is six.

Under normal conditions disk array controller 30 sends a normal operating signal or heartbeat via connector 320 to disk array controller 230. Disk array controller 230 sends a normal operating signal via connector 330 to disk array controller 130. Disk array controller 130 sends a normal operating signal to disk array controller 30 via connector 310.

In normal operation, the switching means 90 and 91, 190 and 191, and 290 and 291 in cores 70, 170, and 270, respectively, are normally open while each host computer and disk array controller is functioning normally. Under these normal conditions the channels of subsystems 11, 111 and 211 are electrically isolated from each other. The relative speed achieved by the system is the sum of the N single RAID subsystems or, in FIG. 4, 300% of the speed of a single RAID subsystem when the speed of the subsystems are equal.

In the rare event of failure of one host computer or disk array controller the normal operating signal or heartbeat emitted from a disk array controller is stopped. When the adjacent disk array controller does not receive a normal operating signal it emits a closure signal to the cores which link the channels of the functioning adjacent subsystem with the faulty subsystem. The normally open switching means are now closed and the electrical connections between the channels of the functional and non-functional systems are closed, allowing the functional system to control the DASD of both systems.

In FIG. 4, if the host computer 110 or disk array controller 130 of subsystem 111 fails, the normal operating signal or heartbeat emitted from disk array controller 130 to disk array controller 30 via connector 310 would cease. Disk array controller 30 would emit a closure signal to core 70 via connector 440. The switching means 90–91 in cores 70 would close, establishing electrical connection between channels 1–2 of subsystems 11 and 111, respectively. Disk array controller 30 would then control the read and write function of the DASD of both subsystem 11 and 111. Under these fault conditions the relative speed expected of the two involved subsystems is 100% of that expected from a single RAID subsystem.

In FIG. 4, channel 1 of one subsystem is shown as connected by the switching means in the core to channel 1 of the adjacent RAID subsystem. It is not necessary that channels having the same numbers are served by a single switching means. It is necessary, however, that channel identifiers are included in the information sent to and received from each channel in order to allow the active disk array controller to identify the correct channel when the active disk array controller is controlling channels from two RAID subsystems.

In analogous fashion, failure of host computer 10 or disk array controller 30 of subsystem 11 would result in cessation of the normal operating signal or heartbeat from disk array controller 30 to disk array controller 230. Disk array controller 230 would emit a closure signal to core 270 via connector 450. The switching means 290–291 in core 270 would close, establishing electrical connection between channels 1–2 of subsystems 11 and 211, respectively. Disk array controller 230 would then control the read and write function of the DASD of both subsystem 11 and 211. Under these fault conditions the relative speed expected of the two involved subsystems is 100% of that expected from a single RAID subsystem.

In an alogous fashion, failure of host computer 210 or disk array controller 230 of subsystem 211 would result in cessation of the normal operating signal or heartbeat from disk array controller 230 to disk array controller 130 via connector 330. Disk array controller 130 would emit a closure signal to core 1 70 via connector 460. The switching means 190–191 in cores 170 would close, establishing electrical connection between channels 1–2 of subsystems 111 and 211, respectively. Disk array controller 130 would then control the read and write function of the DASD of both subsystems 111 and 211.

Connector 20 also connects host computer 10 with disk array controller 130. Similarly connector 120 connects host computer 110 with disk array controller 230. Finally, connector 220 connects host computer 210 with disk array controller 30. Connectors 20, 120 or 220 are used to transfer information from the host computer of a single RAID subsystem which has a faulty host computer or disk array controller to the disk array controller of the functional single RAID subsystem. Under these fault conditions the relative speed expected of the two involved subsystems is 100% of that expected from a single RAID subsystem.

Under the normal operating condition of a system with N single RAID subsystems, the expected speed is the sum of the speeds of the single RAID subsystems or (N)(100%) of a single RAID subsystem if all the single RAID subsystems have the same speed. Under conditions of fault in the host computer or disk array controller of one or more single RAID subsystems, the expected speed is (N−F)(100%) when F is the number of single RAID subsystems with faults and all single RAID subsystems have the same speed.

Figure 5:
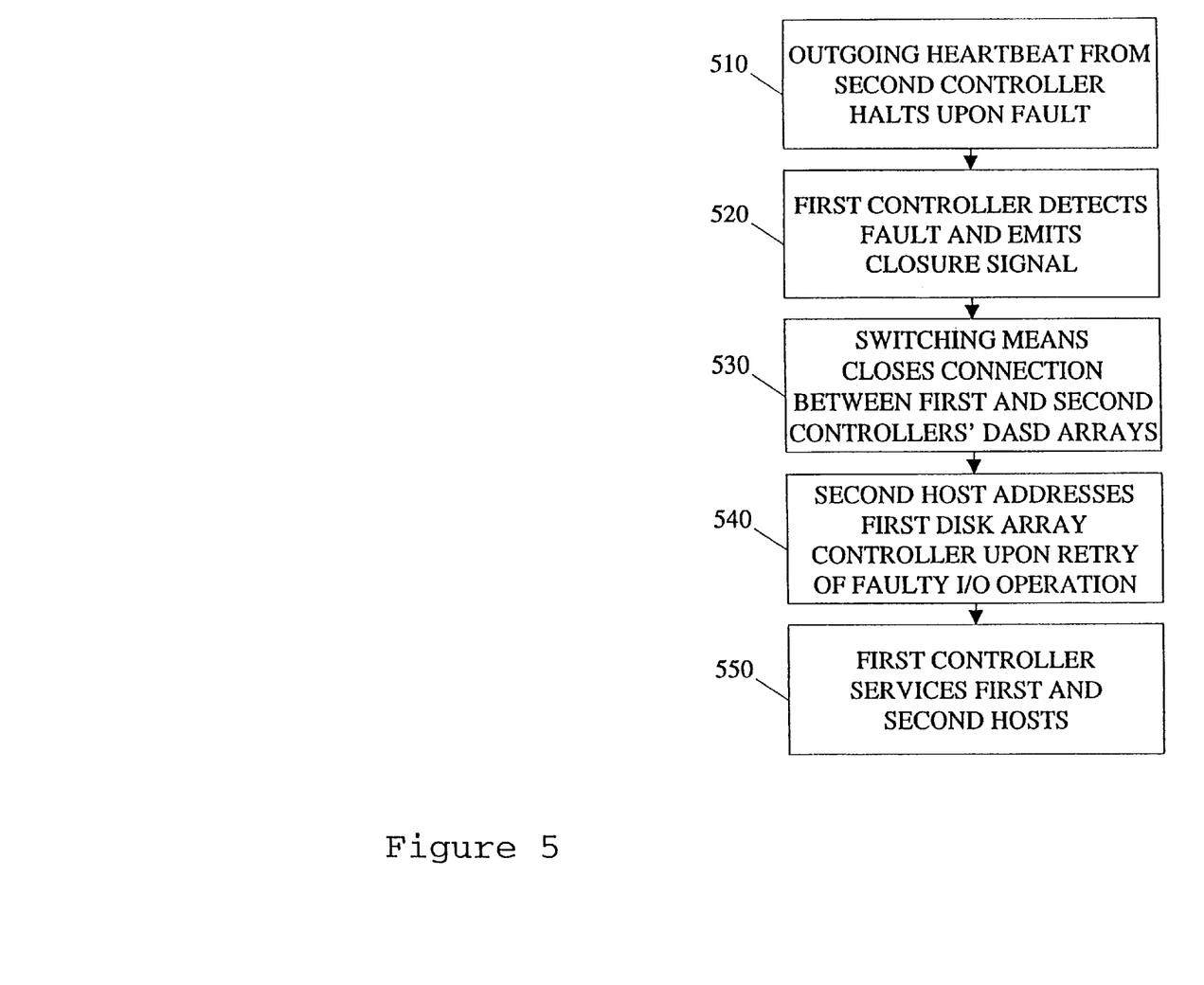
FIG. 5 is a flow chart of the process of operation of the first embodiment invention.

FIG. 5 is a flow chart showing the process in a first embodiment redundant RAID system comprising a first and a second single RAID subsystem and a core which follows the failure of one storage array controller. When the storage array controller of the second single RAID subsystem fails to function normally, the normal operating signal or heartbeat ceases to be emitted by the storage array controller 510. The storage array controller of the first single RAID subsystem notes the cessation of the normal operating signal and emits a closure signal to the switching means in the core 520. The switching means closes, thereby establishing electrical connection between the channels which comprise the arrays of both the first and second single RAID subsystems 530. The storage array controller of the functional first single RAID subsystem appropriates the flow of data to and from the host computer of the defective second single RAID subsystem 540. This occurs after the second host computer makes several futile attempts at I/O operations with the faulty second storage array controller. Finally, storage array controller of the functional first single RAID subsystem serves the channels of both the functional first and second host computers 550.

Figure 6:
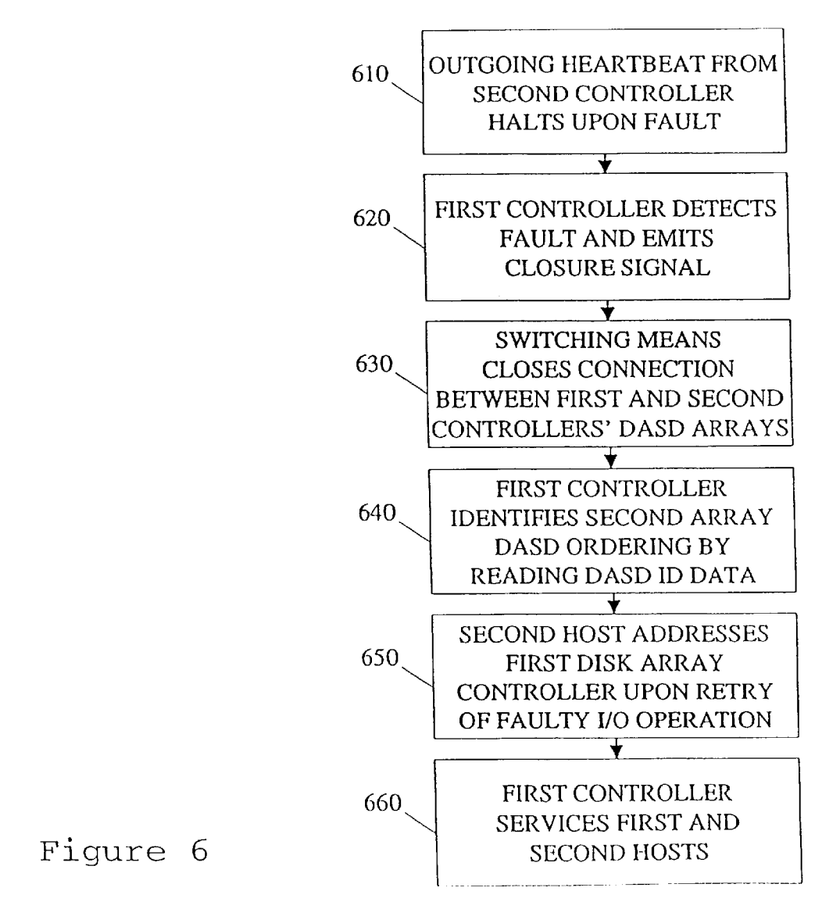
FIG. 6 is a flow chart of the process of operation of the second embodiment invention.

FIG. 6 is a flow chart showing the process in a second embodiment redundant RAID system comprising N single RAID subsystems and N core which follows the failure of one storage array controller. When the storage array controller of a second single RAID subsystem fails to function normally, the normal operating signal or heartbeat ceases to be emitted by the storage array controller 610. The storage array controller of the first single RAID subsystem, which is adjacent to the failed second subsystem, notes the cessation of the normal operating signal and emits a closure signal to the switching means in the core 620. The switching means closes, thereby establishing electrical connection between the channels which comprise the arrays of both the first and second single RAID subsystems 630. The storage array controller of the functional first single RAID identifies the channels of the second single RAID subsystem which are electrically connected to the channels of the first single RAID subsystem by the switching means 640. The storage array controller of the functional first single RAID subsystem appropriates the flow of data to and from the host computer of the defective second single RAID subsystem 650. Finally, the storage array controller of the functional first single RAID subsystem serves the channels of both the functional first and second host computers 660.

Figure 7:
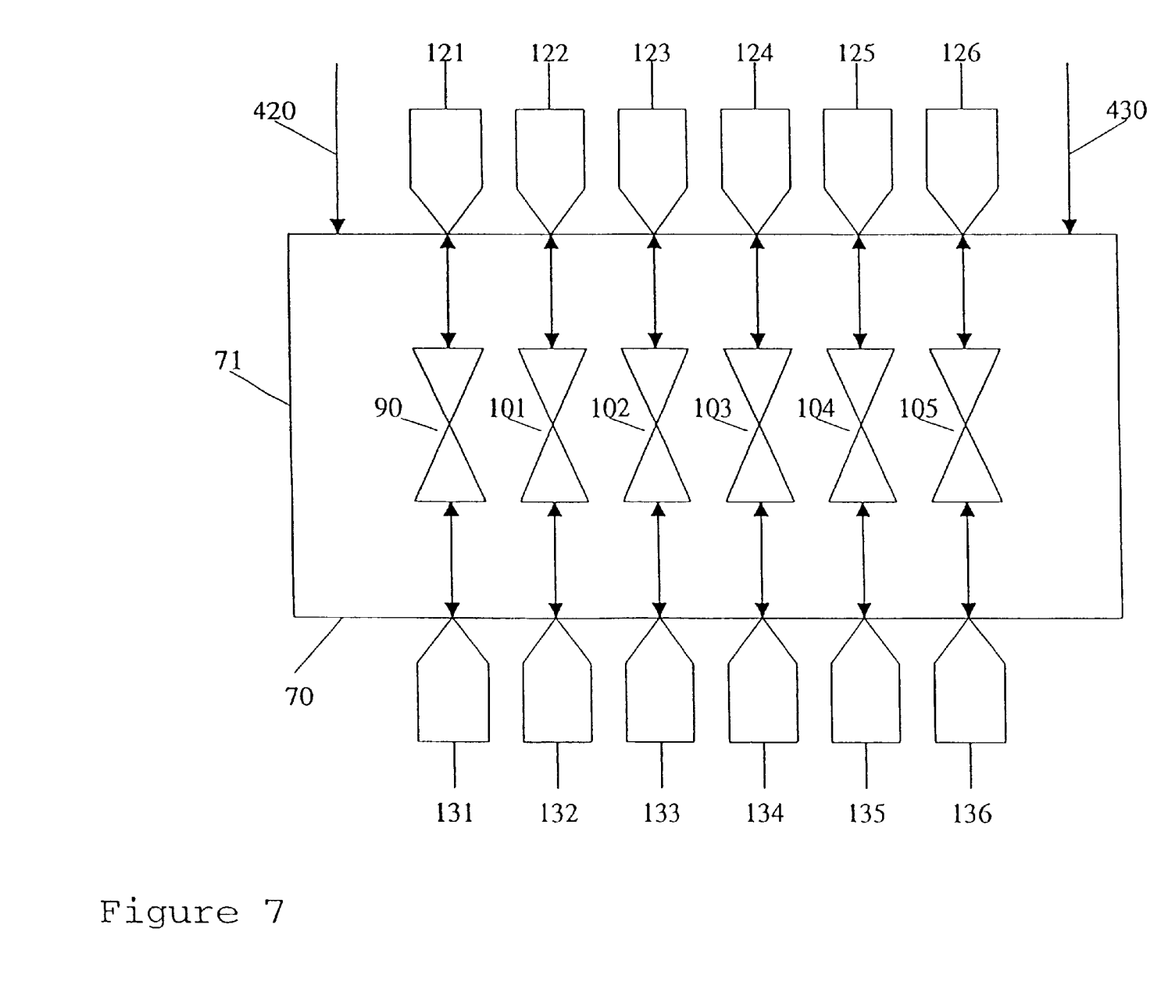
FIG. 7 is a diagrammatic representation of a core.

FIG. 7 is a diagrammatic representation of a core 70 as used with the first embodiment invention. The components of the core 70 are mounted in a case 71. Six repeaters 90, 101, 102, 103, 104, and 105 are mounted in the case. Connectors or channel connection means 121, 122, 123, 124, 125, and 126 are used to make electrical connection with the channels of one single RAID subsystem, 11 in FIG. 3, with the repeaters, 90, 101, 102, 103, 104, and 105. Connectors or channel connection means 131, 132, 133, 134, 135, and 136 are used to make electrical connection with the channels of the other single RAID subsystem, 111 in FIG. 3, with the repeaters, 90, 101, 102, 103, 104, and 105. In this arrangement, there is no electrical connection between the channels of single RAID subsystems 11 and 111 when the repeaters are in the open position. There is electrical connection between the channels of single RAID subsystems 11 and 111 when the repeaters are in the closed position. Connector 420 receives the closure signal from one disk array controller, 30 in FIG. 3, and connector 430 receives the closure signal from the other disk array controller, 130 in FIG. 3.

The core 70 of FIG. 7 is also used in the second embodiment of the invention with the exception that only one connector is used to receive the closure signal from a storage array controller.

It will be apparent to those skilled in the art that the examples and embodiments described herein are by way of illustration and not of limitation, and that other examples may be used without departing from the spirit and scope of the present invention, as set forth in the claims.

I claim:

1. A fault-tolerant RAID system having N host computers and N storage array controllers with redundancy in the host computers and storage array controllers comprising:

N single RAID subsystems, each single RAID subsystem comprising;
    one host computer,
    one storage array controller,
    each host computer electrically connected to a storage array controller by connector means, and
    one array of direct access storage units comprising a multiplicity of channels, each channel comprising a multiplicity of direct access storage units electrically connected with each other in series by connector means, connector means connecting each storage array controller with one array, each storage array controller with the capacity to control two arrays, and N cores, each core having switching means with an open position and a closed position, and connection means whereby each switching means may be connected to two channel connection means, and whereby each switching means controls the electrical connection between the two channel connection means, each core connected by channel connection means to each channel of the array of a first single RAID subsystem and to each channel of the array of an adjacent second simple RAID subsystem, thereby dividing the N single RAID subsystems into N pairs, each pair comprising a first and a second adjacent single RAID subsystem and one core, and connecting means, the first adjacent single RAID subsystem of one pair being the second adjacent single RAID subsystem of an adjacent pair, the switching means within each core connected to the channels so when the switching means is in the closed position each channel of the array of the first single RAID subsystem of a pair is electrically connected bidirectionally to a single channel of the second single RAID subsystem of the same pair, thereby allowing the storage array controller of the first single RAID subsystem to control both arrays of the pair, indicator connecting means connecting the storage array controller of the first single RAID subsystem of a pair with the core of the pair, the storage array controller of the second single RAID subsystem of the pair providing a normal operating signal to the host computer of the first single RAID subsystem of the pair via connector means when the storage array controller and the host computer of the second single RAID subsystem are operating normally, the storage array controller of the second single RAID subsystem of the pair not providing a normal operating signal to the host computer of the first single RAID sub system of the pair via connector means when the storage array controller or the host computer of the second single RAID subsystem has failed, the host computer of the first single RAID subsystem of the pair providing a closure signal via indicator connector means to the core when no normal operating signal is received from the storage array controller of the second single RAID subsystem of the pair, the switching means being normally open so there is no electrical connection between the channels of one single RAID subsystem and the channels of the other single RAID subsystem of a pair when no closure signal is received by the core, the switching means being changed to the closed position when the core receives a closure signal from the host computer of the first single RAID subsystem of the pair, thereby establishing an electrical connection between the channels of both of the single RAID subsystems of a pair and allowing the functioning controller and host computer of the first single RAID subsystem to control the channels of both the first and second single RAID subsystems of the pair.

2. The system of claim 1 wherein the switching means is a repeater.

3. The system of claim 1 wherein the direct access storage units are disks, tapes, or CDS.

4. The system of claim 1 wherein the direct access storage units are disks.

5. The system of claim 1 wherein the connecting means connecting each storage array controller with one array is an IDE, SCSI or Fibre Channel interface.

6. The system of claim 1 wherein the number of single RAID subsystems is 2, there is only one pair of single RAID subsystems, each single RAID subsystem functions as both the first and second RAID subsystem of the pair, and there is only one core which is connected by indicator means to each member of the pair of single RAID subsystems.

7. The system of claim 2 wherein an independent repeater circuit serves each channel.

8. The system of claim 5 wherein the connecting means connecting each storage array controller with one array is a SCSI interface.

9. A fault-tolerant RAID system having 1 host computer and 2 storage array controllers with redundancy in the host computers and storage array controllers comprising:

two single RAID subsystems, each single RAID subsystem comprising;

one host computer, one storage array controller, each host computer electrically connected to a storage array controller by connector means, and one array of direct access storage units comprising a multiplicity of channels, each channel comprising a multiplicity of direct access storage units electrically connected with each other in series by connector means, the connector means having channel connection means, connector means connecting each storage array controller with one array, each storage array controller with the capacity to control two arrays, and one core having switching means with an open position and a closed position, and connection means whereby each switching means may be connected to two channel connection means, and whereby each switching means controls the electrical connection between the two channel connection means, each core connected by channel connection means to each channel of the array of a first single RAID subsystem and to each channel of the array of an adjacent second single RAID subsystem, forming a pair of single RAID subsystems, the switching means within the core connected to the channels so that when the switching means is in the closed position each channel of the array of one single RAID subsystem of a pair is electrically connected bidirectionally to a corresponding channel of the other single RAID subsystem of the pair, thereby allowing the storage array controller of one single RAID subsystem to control both arrays of the pair, indicator connecting means connecting the storage array controllers of each single RAID subsystem of a pair with the core of the pair, the storage array controller of each single RAID subsystem of the pair providing a normal operating signal to the host computer of the other single RAID subsystem of the pair via connector means when the storage array controller and the host computer of that single RAID subsystem are operating normally, the storage array controller of either single RAID subsystem of the pair not providing a normal operating signal to the host computer of the other single RAID system of the pair via connector means when the storage array controller or the host computer of that single RAID subsystem has failed, the host computer of either single RAID subsystem of the pair providing a closure signal via indicator connector means to the core when no normal operating signal is received from the storage array controller of the other single RAID subsystem of the pair, the switching means being normally open so there is no electrical connection between the channels of one single RAID subsystem and the channels of the other single RAID subsystem of a pair when no closure signal is received by the core, the switching means being changed to the closed position when the core receives a closure signal from the host computer of either single RAID subsystem of the pair, thereby establishing an electrical connection between the channels of both of the single RAID subsystems of a pair and allowing the functioning controller and host computer of one single RAID subsystem to control the channels of both single RAID subsystems of the pair.

10. The system of claim 9 wherein the switching means is a repeater.

11. The system of claim 9 wherein the direct access storage units are disks, tapes, or CDS.

12. The system of claim 9 wherein the direct access storage units are disks.

13. The system of claim 9 wherein the connecting means connecting each controller with one array of direct access storage units is an IDE, SCSI or Fibre Channel interface.

14. The system of claim 9 wherein the connecting means connecting each controller with one array of direct access storage units is a SCSI interface.

15. The system of claim 10 wherein an independent repeater circuit serves each channel.

16. In a redundant RAID system having N single RAID subsystems and a core with repeater switching means connecting the channels of each single RAID subsystem with the channels of the adjacent single RAID subsystem, the process of controlling the arrays of direct access storage units of both the first and the second adjacent single RAID subunits by the first single RAID subsystem when the second adjacent single RAID subunit has a faulty storage array controller comprising the steps:

a. ceasing to emit a normal operating signal or heartbeat by the storage array controller of the second adjacent single RAID subsystem having a faulty storage array controller, b. noting the cessation of emission of a normal operating signal by the storage array controller of the second adjacent single RAID subsystem by the first single RAID subsystem, and emitting a close signal by the first single RAID subsystem to the core connecting the channels of the first single RAID subsystem with the channels of the second adjacent single RAID subsystem, c. closing switching means in the core thereby establishing electrical connections between the channels of the first single RAID subsystem and the channels of the second adjacent single RAID subsystem, d. identifying the channels of the second adjacent single RAID subsystem electrically connected to the channels of the first single RAID subsystem by the storage array controller of the first RAID subsystem, e. appropriating the flow of data to and from the host computer of the second adjacent single RAID subsystem by the storage array controller of the first single RAID subsystem, and f. controlling the direct access storage units in the channels of both the first single RAID subsystem and of the second adjacent single RAID subsystem by the storage array controller of the first single RAID subsystem.

17. In a redundant RAID system having a first and a second single RAID subsystem, each subsystem comprising a storage array controller and multiple channels of direct access storage devices, and a core with repeater switching means connecting the channels of the first single RAID subsystem with the corresponding channels of the second single RAID subsystem, the process of controlling the arrays of direct access storage units of both single RAID subunits by the first single RAID subsystem when the second single RAID subsystem has a faulty storage array controller comprising the steps:

a. ceasing to emit a normal operating signal or heartbeat by the storage array controller of the second single RAID subsystem having a faulty storage array controller, b. noting the cessation of emission of a normal operating signal or heartbeat by the storage array controller of the second single RAID subsystem having a faulty storage array controller by the first single RAID subsystem, and emitting a close signal by the first single RAID subsystem to the core, c. closing switching means in the core thereby establishing electrical connections between the channels of the first single RAID subsystem and the channels of the second single RAID subsystem, d. appropriating the flow of data to and from the host computer of the second single RAID subsystem by the host computer of the first single RAID subsystem, and e. controlling the direct access storage units in the channels of both the first single RAID subsystem and of the second single RAID subsystem by the storage array controller of the first single RAID subsystem.

* * * * *